United States Patent
Gudipaty et al.

(10) Patent No.: US 10,389,769 B2
(45) Date of Patent: Aug. 20, 2019

(54) INTEGRATED REAL TIME COLLABORATION EXPERIENCES WITH ONLINE WORKSPACE

(71) Applicant: Microsoft Technology Licensing, LLC, Redmond, WA (US)

(72) Inventors: Ananta Gudipaty, Kirkland, WA (US); Kapil Sharma, Woodinville, WA (US); Donna Shaw, Andover, MA (US); Natasha Desai, Bellevue, WA (US); Samer Fouad Sawaya, Snoqualmie, WA (US); Andrew Ash, Netanya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 687 days.

(21) Appl. No.: 14/984,305

(22) Filed: Dec. 30, 2015

(65) Prior Publication Data
US 2016/0112476 A1 Apr. 21, 2016

Related U.S. Application Data

(63) Continuation of application No. 12/022,266, filed on Jan. 30, 2008, now abandoned.

(51) Int. Cl.
G06Q 10/10 (2012.01)
H04L 29/06 (2006.01)
G06F 3/0482 (2013.01)
G06F 3/0484 (2013.01)

(52) U.S. Cl.
CPC .......... *H04L 65/403* (2013.01); *G06F 3/0482* (2013.01); *G06F 3/04842* (2013.01); *G06Q 10/10* (2013.01); *G06Q 10/1095* (2013.01)

(58) Field of Classification Search
None
See application file for complete search history.

(56) References Cited

U.S. PATENT DOCUMENTS

| | | | |
|---|---|---|---|
| 5,627,978 A | 5/1997 | Atom et al. | |
| 6,611,822 B1 | 8/2003 | Beams et al. | |
| 6,629,129 B1 | 9/2003 | Bookspan et al. | |
| 7,069,266 B2 | 6/2006 | Calderaro et al. | |
| 7,124,164 B1 * | 10/2006 | Chemtob | G06Q 10/10 709/204 |
| 7,159,178 B2 | 1/2007 | Vogt et al. | |

(Continued)

OTHER PUBLICATIONS

"Microsoft Office Groove Server 2007", Retrieved from <<download.microsoft.com/download/3/d/b/3db2d394-d63b-4f0f-93b5-6a1246e85034/GrooveServer2007Guide.doc>>, Mar. 2006, 31 Pages.

(Continued)

*Primary Examiner* — Anita Coupe
*Assistant Examiner* — Nancy Prasad (57) ABSTRACT

Online meeting experience is integrated with online and/or offline collaborative workspace(s). Documents and other content generated through team collaboration and managed by a content management system are automatically made available during the meeting, updated, and stored in collaborative workspace linked to a particular meeting. Newly generated content during the meeting is also added to the workspace. As a result, online meetings become part of the collaborative workspace rendering reusable and searchable data through meeting content and updates to associated documents.

20 Claims, 10 Drawing Sheets

(56) References Cited

U.S. PATENT DOCUMENTS

| | | | |
|---|---|---|---|
| 2002/0119434 A1 | 8/2002 | Beams et al. | |
| 2002/0138317 A1 | 9/2002 | Mok et al. | |
| 2003/0187763 A1* | 10/2003 | Jordan | G06Q 30/02 705/35 |
| 2004/0111472 A1 | 6/2004 | Swanson et al. | |
| 2004/0117446 A1* | 6/2004 | Swanson | G06Q 10/1095 709/205 |
| 2005/0192822 A1 | 9/2005 | Hartenstein et al. | |
| 2006/0195519 A1 | 8/2006 | Slater et al. | |
| 2007/0208806 A1 | 9/2007 | Mordecai et al. | |
| 2009/0192845 A1 | 7/2009 | Gudipaty et al. | |

OTHER PUBLICATIONS

Kumar, "Digital Collaboration", Retrieved from <<http://web.archive.org/web/20071027023046/http://www.avanade.com/de/_uploaded/pdf/avanadedigitalcollaborationpov774383.pdf>>, Sep. 12, 2006, 16 pages.

"Microsoft Integration", Retrieved from <<http://www.tx3.biz/Microsoft%20Integration.html>>, Retrieved on: Sep. 27, 2007, 3 Pages.

"Microsoft's Real-Time Collaboration Offerings Join Microsoft Office Family and Get "Live"", Retrieved from <<http://web.archive.org/web/20051013124706/http://www.microsoft.com/presspass/press/2003/uI03/07-24RTCBetterFasterPR.mspx>>, Jul. 24, 2003, 2 Pages.

U.S. Appl. No. 12/022,266, Amendment and response filed Sep. 22, 2011, 14 pages.

U.S. Appl. No. 12/022,266, Amendment and response filed Jun. 15, 2012, 12 pages.

U.S. Appl. No. 12/022,266, Amendment and response filed May 24, 2013, 11 pages.

U.S. Appl. No. 12/022,266, Amendment and response filed Dec. 10, 2013, 12 pages.

U.S. Appl. No. 12/022,266, Amendment and response filed Jun. 2, 2015, 20 pages.

U.S. Appl. No. 12/022,266, Office Action dated Jun. 22, 2011, 18 pages.

U.S. Appl. No. 12/022,266, Office Action dated Feb. 15, 2012, 17 pages.

U.S. Appl. No. 12/022,266, Office Action dated Feb. 26, 2013, 18 pages.

U.S. Appl. No. 12/022,266, Office Action dated Sep. 10, 2013, 20 pages.

U.S. Appl. No. 12/022,266, Office Action dated Jan. 2, 2015, 19 pages.

U.S. Appl. No. 12/022,266, Office Action dated Sep. 25, 2015, 25 pages.

* cited by examiner

INTEGRATED REAL TIME COLLABORATION EXPERIENCES WITH ONLINE WORKSPACE

CROSS-REFERENCE TO RELATED APPLICATIONS

This application is a continuation application of U.S. patent application Ser. No. 12/022,266, entitled "INTEGRATED REAL TIME COLLABORATION EXPERIENCES WITH ONLINE WORKSPACE," filed on Jan. 30, 2008, the entire disclosure of which is hereby incorporated herein by reference.

BACKGROUND

With the development and proliferation of online tools and networking capabilities of desktop applications such as word processing applications, spreadsheet applications, presentation applications, and the like, online collaboration has become a real and necessary part of daily life. Many organizations employ people who may be in different physical and geographical locations, but using online collaboration teams do not have physical boundaries anymore.

Typical online collaboration involves sharing of documents and other content with a backbone system providing necessary tracking and conflict resolution services when two or more people work on the same document or other content. Software code may be written and tested by a number people who collaborate online meaning, they can make changes to the code being developed collectively without losing track of who made which change.

Another aspect of online collaboration is online communication. While conventional phone and/or video conferencing systems exist, online meeting systems are increasingly complementing or replacing those conventional methods. In an online meeting, participants can not only exchange messages (voice, text, video, etc.), but they can also work on one or more documents while communicating with each other. Thus, online meetings are becoming a significant part of online collaboration. However, existing technology typically treats online or otherwise communications (e.g. online meetings) separately from other forms of collaboration. For example, a team may have a shared workspace where documents are collectively worked on. When the same team holds an online meeting, the meeting records, changes to any documents or newly created documents have to be manually moved to the shared workspace resulting in a broken up collaborative experience.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to integrating real time collaboration experiences such as online meetings with shared workspace(s). In a system according to embodiments, meetings may be organized, initiated, and recorded through a workspace. Relevant documents and content may be made available automatically for the online meeting. Changes to relevant documents, newly created content, as well as a record of the meeting may be stored in the workspace with appropriate indexing and linking such that data generated through the meeting is re-usable and searchable.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 7 is another example screenshot of the collaborative team site UI of FIG. 6 illustrating how content modified or generated during online meetings can be stored on the collaborative team site and versioned, archived, searched, and the like;

DETAILED DESCRIPTION

As briefly described above, online meetings and collaborative workspaces can be integrated such that meetings can be more efficient through the availability of relevant shared content and records of the meetings and changes to content can be made part of the workspace. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

While the terms content and document are used interchangeably in portions of this document, content is meant to represent any form of data that can be part of a collaborative team site such as audio data, video data, images, graphics, and so on. Document is generally understood to be files associated with textual and/or graphics data such as word processing documents, spreadsheet documents, and so on. Embodiments may be implemented for sharing any type of content and/document with an integrated online meeting experience.

Moreover, the terms collaborative team site and shared workspace are used throughout the document. Collaborative team site refers to an online entity that enables participants to share and collaboratively develop content (and/or documents) within a defined realm such as a project. Shared workspace is typically understood as the virtual location of collaborated documents/content. Thus, a collaborative team site may include one or more shared workspaces. Still, any interchanged use of these terms or the use of one term instead of the other should not be interpreted as having a significant impact on embodiments. A shared workspace may be an online or offline entity.

Figure 1:
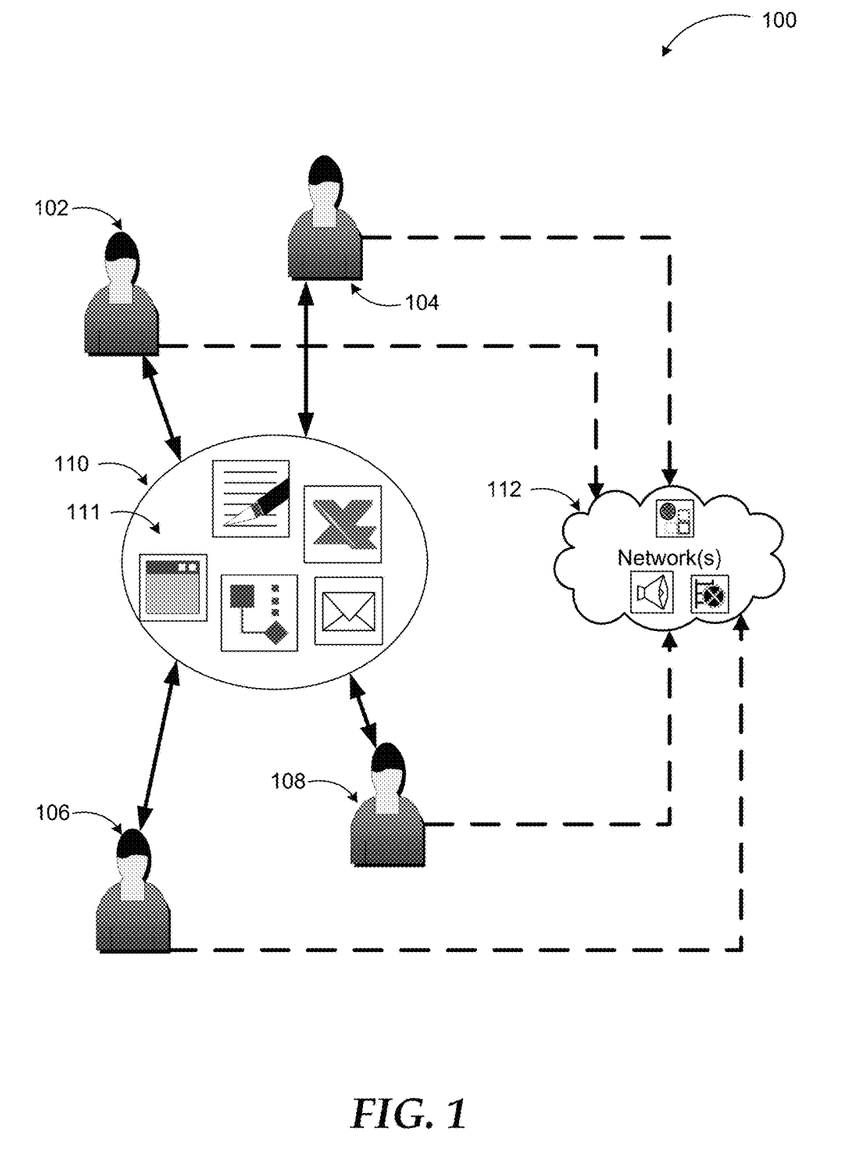
FIG. 1 is a conceptual diagram illustrating collaborative experiences between users that involve a shared workspace and an online meeting.

Referring to FIG. 1, conceptual diagram 100 of collaborative experiences between users that involve a shared workspace and an online meeting, is illustrated. Shared workspaces (e.g. 110) provide users (102, 104, 106, 108) a platform to collaborate on a wide variety of topics. For example, project teams may work on a number of documents such as specification documents, project spreadsheets, customer presentations, or even programming codes without having to physically send a document (or content) to each other—as exemplified by the icons in shared workspace 110, manually keep track of changes, and so on.

Shared workspaces may be created on a collaborative team site within a secure enterprise network, on the Internet, or through any other networked means. Many available shared workspace applications provide automated versioning, archiving, and search capabilities for the shared content. This enables people, even far apart, to work together as a team.

Another aspect of teamwork is communication between team members. In many instances, voice, video, or at least textual exchange of ideas is a necessity for successful collaboration. People collaborating on a project typically utilize various communication modes such as instant messaging, electronic mail, conference calls, video conferences, and the like, all of which involve some form of a communication network (112).

An increasingly popular method of communicating while working on a collaborative project is online meeting. Online meetings allow participants to exchange textual messages (sometimes complemented by voice or video communication, separate or as an integral part of the online meeting). Moreover, participants are sometimes also enabled to work on a shared document. Some applications allow one participant to modify (or create) a document while others view it. Other applications allow collaborative modification of the same document.

However, one major disadvantage of conventional systems is that online meetings are typically disconnected from or not well integrated with shared workspaces. When content from a meeting is modified or new content is created, it has to be manually brought into the shared workspace (e.g. indexed, formatted, or linked to other relevant content within the workspace such that an integrity and searchability of the shared workspace is preserved). In addition, meeting records are typically integrated into the shared workspace manually too. The content that is needed for the meeting has to be uploaded or made part of the meeting manually by an organizer. Thus, the disconnect between the online meeting capabilities and shared workspaces prevents a seamless user experience for an online collaborative team effort.

Figure 2:
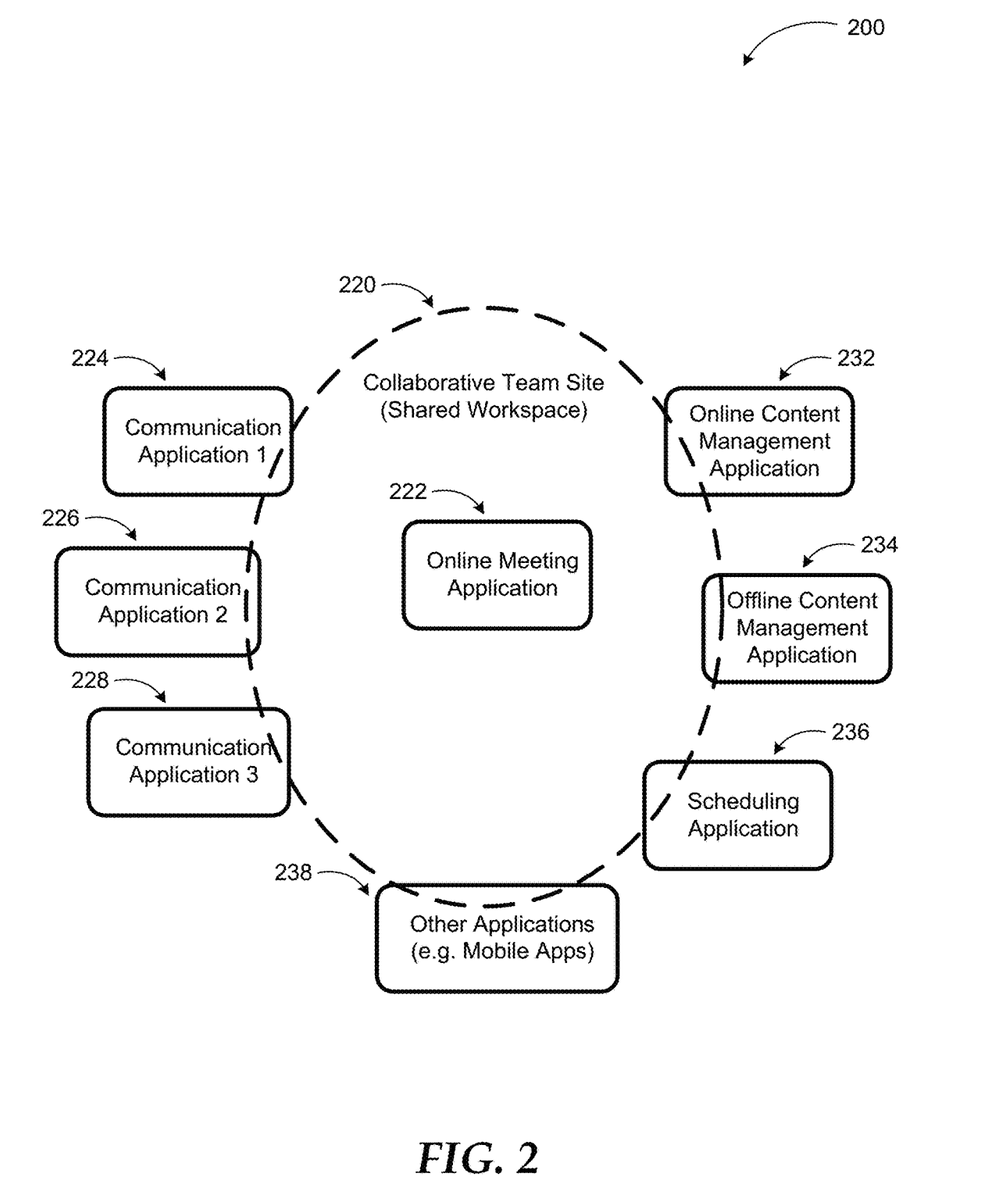
FIG. 2 is a diagram of main components in a collaborative team site or shared workspace that integrates online meetings with content collaboration.

FIG. 2 is a diagram of main components in a collaborative team site or shared workspace that integrates online meetings with content collaboration. Shared workspaces may operate real time or asynchronously. A managing application commonly keeps track of shared content performing versioning, archiving, indexing (for searchability), and similar tasks. In the case of asynchronous or offline collaboration, a participant typically checks out a document (or content) makes changes while offline, and any conflicts are resolved when the document is checked back in based on predefined rules or dynamically.

A collaborative team site or shared workspace (220) according to embodiments, thus, cooperates with an online content management application 232 and an offline content management application 234. Of course, these functionalities may be provided within the same shared workspace application or service too. In addition to the content management aspect, shared workspace applications or services work together with a variety of applications. Scheduling application 236 is one example. Scheduling application 236 may provide calendaring, electronic mail, contact management, or other services in conjunction with the shared workspace.

A shared workspace service according to a preferred embodiment coordinates with an online meeting application 222 or includes within itself integrated online meeting functionality. Through the integrated online meeting functionality, meetings can be organized based on selected content from the shared workspace (e.g. selection of participants or invitees, inclusion of documents to be viewed or modified during the meeting, etc.). Any changes made to content within the shared workspace, any newly created content (e.g. whiteboard capture images, new documents), and even a recording (audio, video, or textual) of the meeting itself can be integrated into the shared workspace automatically. The integration may include versioning and/or archiving of content affected by the meeting, linking of content through the meeting, maintenance of a history of meetings linked with associated documents, and processing of content affected by the online meeting (e.g. newly created content, modified content, and meeting records) for reusability and searchability within the shared workspace.

For example, a survey of participants during a sales meeting may take place for a particular product. The survey results may be saved as a new document along with appropriate keywords for subsequent searches and links to other product documentation (as well as to the meeting record) at the conclusion of the meeting. If a product specification was modified during the same meeting, the modified specification may also be saved as a new version of the existing document with a link to the meeting such that a user of the shared workspace can later determine when and why the specification was modified.

Online meetings may be complemented with other forms of communication such as email, phone conference, video conference, and the like. Thus, the online meeting application 222 may work together with communication applications 224, 226, and 228. Alternatively, the online meeting application 22 may provide those communication modes itself. The online meeting and/or collaboration functionality for shared content may also be provided through other applications (238) such as a mobile online meeting application, a mobile content processing application, and the like.

One significant aspect of integrating online meeting experience into shared workspaces is managing offline content. Thus, a system according to embodiments may enable a shared workspace user to prepare an online meeting by selecting relevant documents and configuration parameters offline, providing those to the shared workspace, and then retrieving meeting results in a seamlessly integrated manner after the meeting (versioned and updated content, meeting records, and so on).

The integrated online meeting may be initiated from a variety of points within the shared workspace. Any component application such as scheduling application 236 may be configured to select documents within the shared workspace, prepare a meeting invitation automatically configuring meeting parameters (invitees, subject, links, etc.), and initiating the meeting. Alternatively, the meeting may be initiated directly from a shared workspace user interface where the shared content is listed (as discussed below in conjunction with FIG. 5).

Hence, by integrating real time online meeting experiences of users with collaboration features of a shared workspace, a seamless collaboration experience to users of the shared workspace participating online or offline can be provided.

Figure 3:
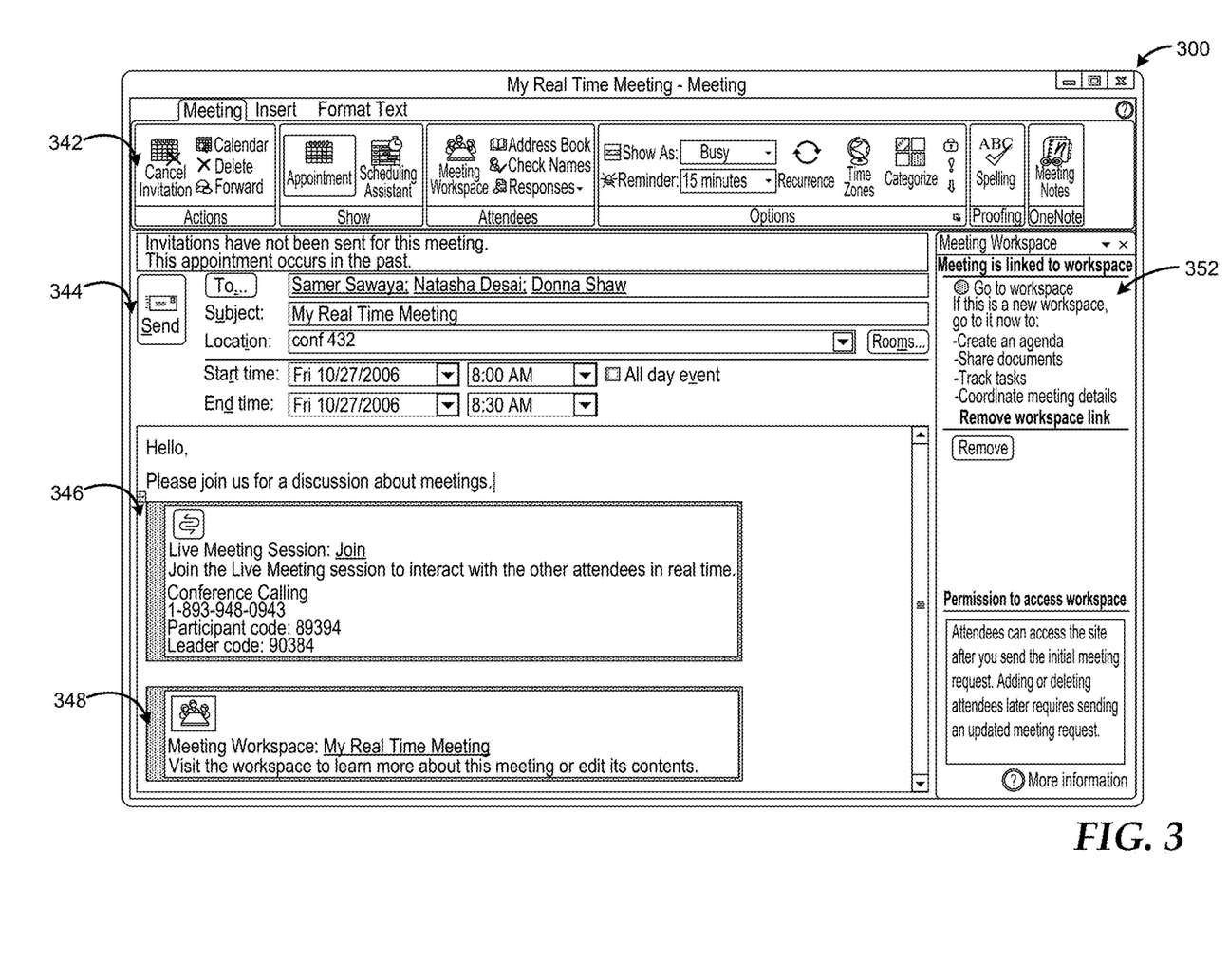
FIG. 3 is an example screenshot of a scheduling application user interface (UI) that enables organization and initiation of an online meeting integrated into a collaborative team site.

FIG. 3 is an example screenshot of a scheduling application user interface (UI) that enables organization and initiation of an online meeting integrated into a collaborative team site. Scheduling applications may perform calendaring, contact management, as well as communication management tasks. OUTLOOK® family of products from MICROSOFT Corp. of Redmond, Wash. is an example of a multifaceted scheduling application that also provides electronic mail services.

As mentioned previously, an online meeting integrated with a shared workspace may be initiated from any application associated with the shared workspace. For example, a word processing application may be configured to initiate an online meeting and automatically associate the meeting with a currently open document (or family of documents). A scheduling application is another example application for initiating an online meeting and an intuitive one. UI 300 of the scheduling application includes a standard user controls bar 342 with icons and drop-down menu selections for various tasks such as controls for creating an appointment, initiating a meeting invitation, setting various attributes of an appointment, opening a calendar, and so on. In the example screenshot of FIG. 3, a meeting invitation has been initiated.

A top portion of the invitation indicated by reference numeral 344 is a typical meeting invitation with the listing of addressee(s), subject, location, time, etc. Differently from a conventional meeting invitation, the body portion of the invitation includes first a link (346) describing the organized meeting, its session name, a number to call (if the meeting includes a phone conference component), a pass code, etc. Of course, the meeting may be purely online and not include a separate phone or video conference component, or any combination of the different communication modes.

A second link (348) in the body portion of the invitation provides connection (and a brief description) to the associated shared workspace. According to some embodiments, a meeting may involve more than one shared workspace. In that case, the meeting may have its own workspace that is linked with the plurality of shared workspaces such that participants can view, edit, and collaborate on content in any of the workspaces associated with the meeting.

A task pane (352) on the right side of the invitation provides task-based links associated with the shared workspace such as creating an agenda, sharing documents, tracking tasks, coordinating meeting details, etc. A meeting organizer may select documents to be included in the meeting through this pane, create an agenda for the meeting, and so on. According to other embodiments, the documents for the meeting may be automatically linked to the invitation by the application based on how the invitation was initiated, a configuration of the shared workspace, user preferences, and the like.

Figure 4:
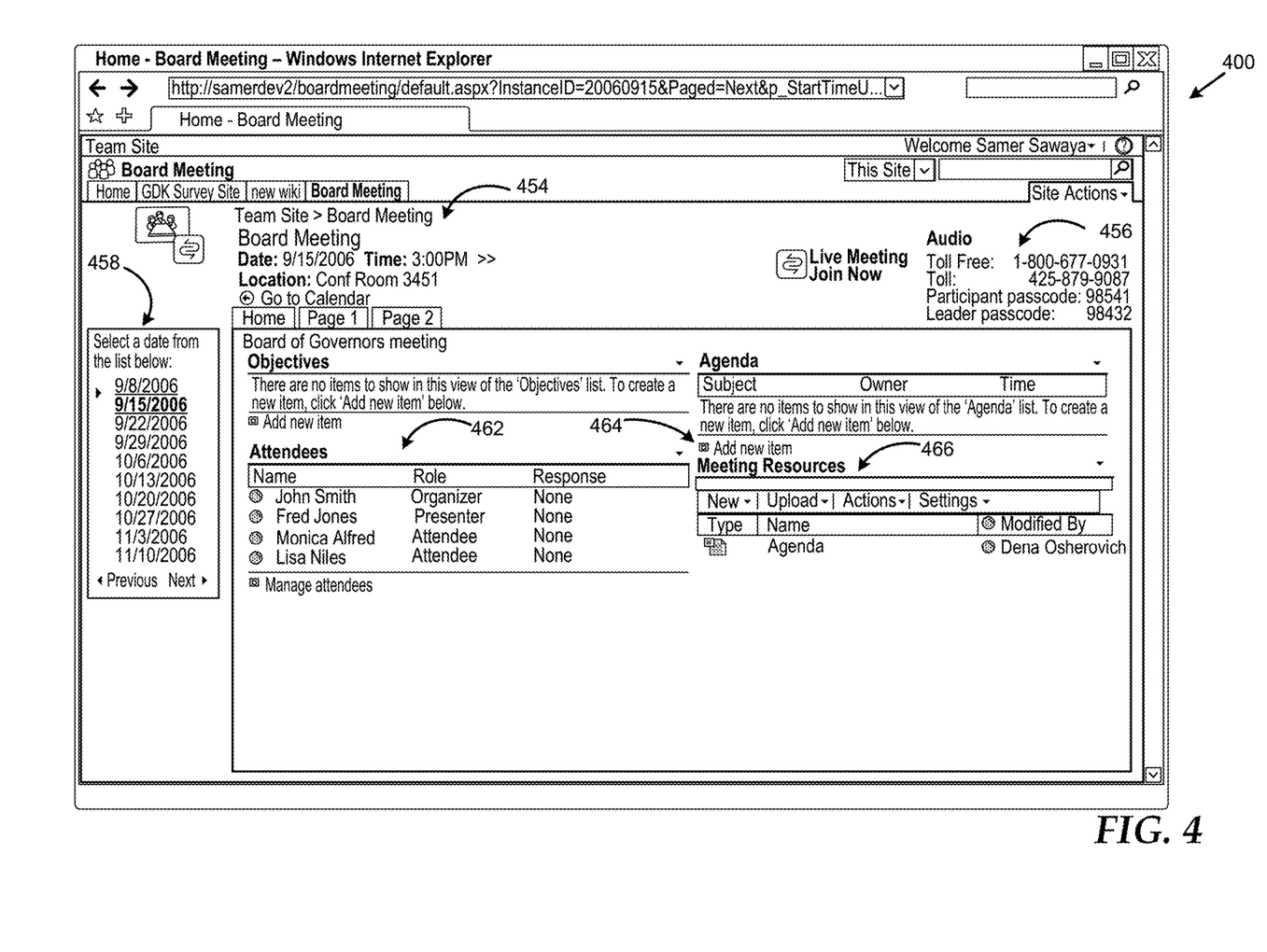
FIG. 4 is an example screenshot of an online meeting application UI integrated into a collaborative team site.

FIG. 4 is an example screenshot of an online meeting application UI integrated into a collaborative team site. Meeting application UI 400 is an example of a web-based meeting application with a Uniform Resource Locator (URL) of the meeting space listed on top.

Following initiation of the meeting in conjunction with a workspace as described above, the meeting is created with various links to the associated shared workspace. For example, a history (as well as future scheduled dates) of recurring meetings may be maintained in the shared workspace to provide a seamless integration experience. Based on the maintained history and associated information, a list of links to past and future meetings is provided in pane 458 of the user interface.

As indicated by reference numeral 454, the meeting is identified by its subject, location, date, and time. In a "Home" tab, the meeting objectives, agenda, attendees (462), and meeting resources (466) are presented. Meeting resources 466 includes a list of associated workspace content such as an agenda document. Any content that may need to be viewed, modified, or created during this meeting may be listed in this portion of the meeting UI with a link to the actual content on the shared workspace. Changes are then recorded in the shared workspace such as saving a new version of the content (document) and associating the new version with this particular meeting. As a result, in a future meeting the participants may open the link to this meeting—which would be past meeting at that time—and view the versions of content associated with this meeting. That way a continuity and logical connection between the changes to the workspace content and the online meetings is established.

A link (464) is also provided for enabling participants (or an organizer of the meeting) to add new items to the meeting resources by either creating a new document or establishing a link to an existing document on the shared workspace. Meeting type and summary information about the meeting type (e.g. audio and call-in number) are provided in the portion of the UI indicated by reference numeral 456.

Figure 5:
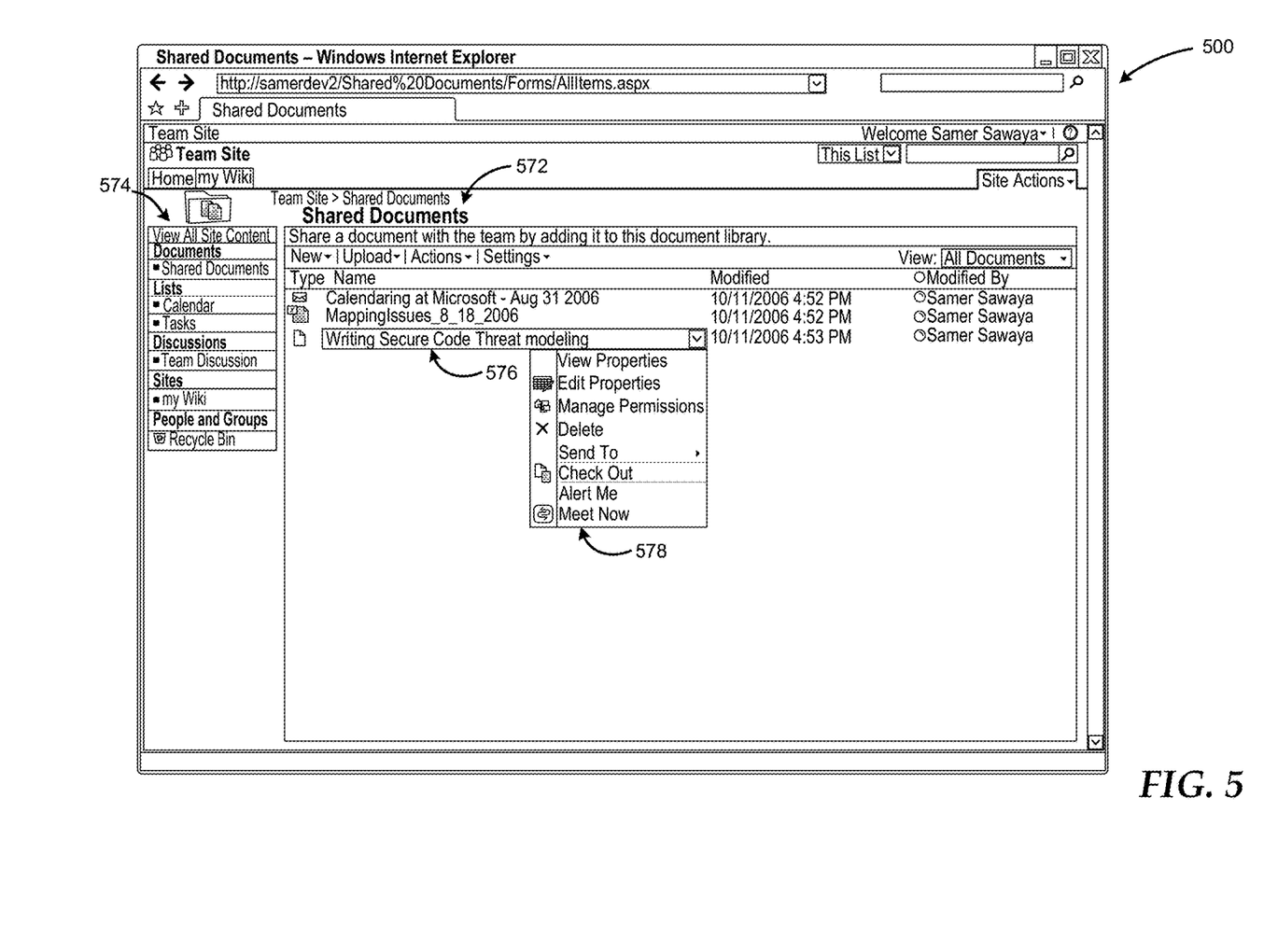
FIG. 5 is an example screenshot of a shared workspace UI illustrating how content can be brought from the collaborative team site into the online meeting.

FIG. 5 is an example screenshot of a shared workspace UI 500 illustrating how content can be brought from the collaborative team site into the online meeting. A shared workspace can be accessed and facilitated through a wide variety of user interfaces. The UI 500 is provided only as an example to illustrate integration of collaboration through a shared workspace and real time collaboration through an online meeting.

UI 500 includes a summary of site contents (574) viewable by category such as documents, lists, discussions, etc. In the main portion shared documents (572) are listed. The list may include any content (e.g. documents, audio recordings, images, or even links to other sites). Information about each document such as date of last modification and modifier (or document owner) is also listed. When a particular document (e.g. 576) is selected, a drop-down menu 578 is provided with options to perform tasks on the document including initiating a meeting. Thus, a shared workspace participant may select one or more documents and initiate a meeting associated with those documents directly from the shared workspace UI. As discussed above, the meeting UI would then list the selected document(s) in its resources pane and provide access to the document(s) for participants in the meeting.

According to some embodiments, attributes of the meeting such as its subject, participants (or invitees), and the like may be automatically determined based on the selected document(s). For example, if the selected document is a specification document, a meeting initiated through the specification document may automatically include the document title in its subject line, invite the people associated with the document and include any associated presentation and emails along with the specification in the meeting resources.

The shared workspace UI 500 and the method of initiating an integrated online meeting from the workspace illustrated here is only an example. Embodiments may be implemented using other user interfaces and methods of initiating meetings in conjunction with the shared workspace and content therein.

Figure 6:
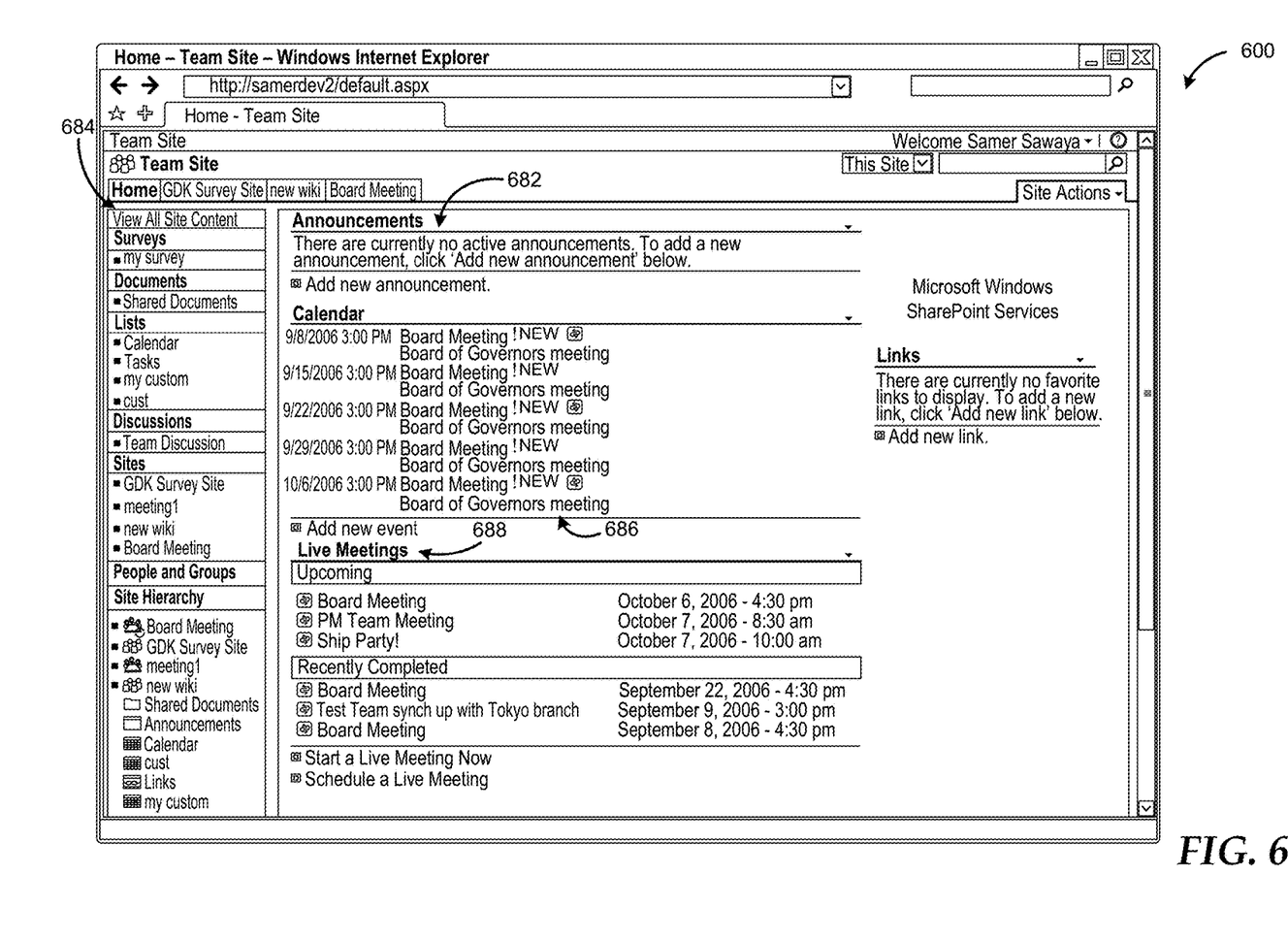
FIG. 6 is an example screenshot of a collaborative team site UI illustrating how a history and future scheduled online meetings associated with the team site can be provided as part of the team site.

FIG. 6 is another example screenshot of a collaborative team site UI illustrating how a history and future scheduled online meetings associated with the team site can be provided as part of the team site.

In the example team site UI 600, the summary pane 684 includes some of the same categories as in FIG. 5 with additional ones such as surveys and site hierarchy. An increasingly popular aspect of online meetings is a survey that can be performed during the meeting about a discussion topic. Survey results may then be stored in the shared workspace (team site) like any other newly created content and associated with the particular meeting (as well as any other relevant documents) allowing site users to view the survey results with the meeting's background information (e.g. how many people participated in the meeting, when was the meeting held, what other topics were discussed, etc.).

The main portion of UI 600 includes an announcements section 682, a calendar of events 686, and a listing of online meetings 688. The calendar of events 686 may include online and/or other forms of meetings, milestones, and any other significant data for the shared workspace. The listing of online meetings 688 may include past and future meetings with links to the meeting space such that a participant can look up details about a past or future meeting, see associated documents, meeting results, created content, and so on. While the meetings and events are presented as a simple list in the example UI, any form of presentation graphical, textual, or combination may be implemented using the principles described herein.

Figure 7:
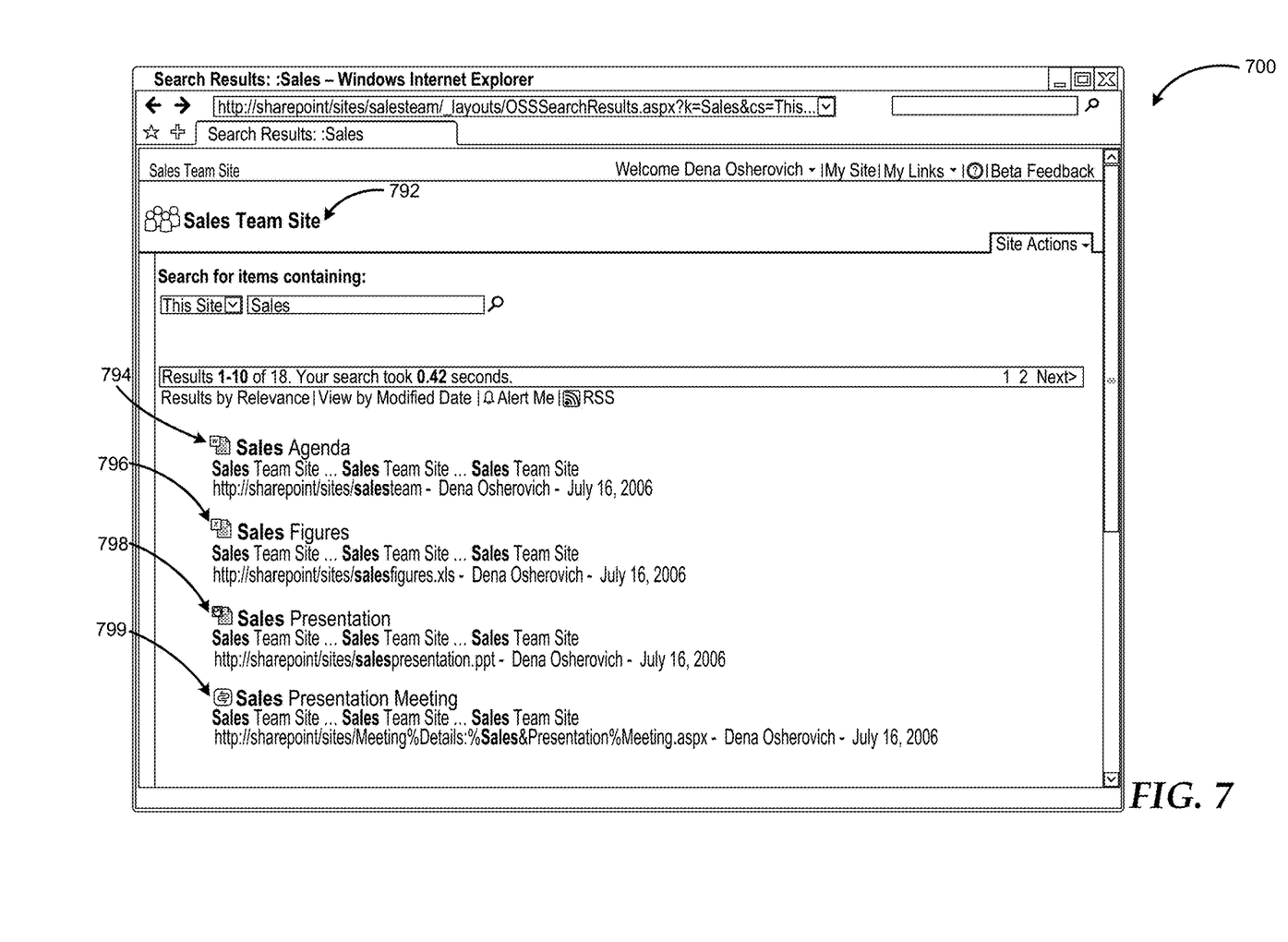

FIG. 7 is another example screenshot of the collaborative team site UI of FIG. 6 illustrating how content modified or generated during online meetings can be stored on the collaborative team site and versioned, archived, searched, and the like.

The example UI 700 is a shared workspace for a sales team. A search box enables users to enter terms for searching through the shared workspace contents including shared documents, meeting records, and the like. As described previously, any content modified or generated during a meeting as well as meeting records themselves (audio, video, textual) are stored in the shared workspace in a reusable and searchable manner. Thus, a participant may perform a keyword search, a document type search, date-based search, and the like.

In the example UI, the search for the keyword "sales" yielded four results. First is a document (794) titled sales agenda. Second is a spreadsheet (796) titled sales figures. Third is a presentation (798) titled sales presentation, and fourth is a meeting recording (799) titled sales presentation meeting. Along with each document summary information such as a location of the document (e.g. URL), a workspace of the document, an owner of the document, and a last modification date may be provided.

According to some embodiments, the search results may also provide a textual or graphic representation of a link between each document and an associated meeting to provide further information about the integration of the online meetings and workspace content to the users.

The user interfaces, contents of the user interfaces, and methods of providing information to the user or performing tasks described in FIG. 3 through FIG. 7 are for illustration purposes only and do not constitute a limitation on the embodiments. Integrating online meetings with shared workspaces and providing tools to user to take advantage of this seamless integration may be implemented through other forms of user interfaces, links, representations, and so on, using the principles described herein.

Figure 8:
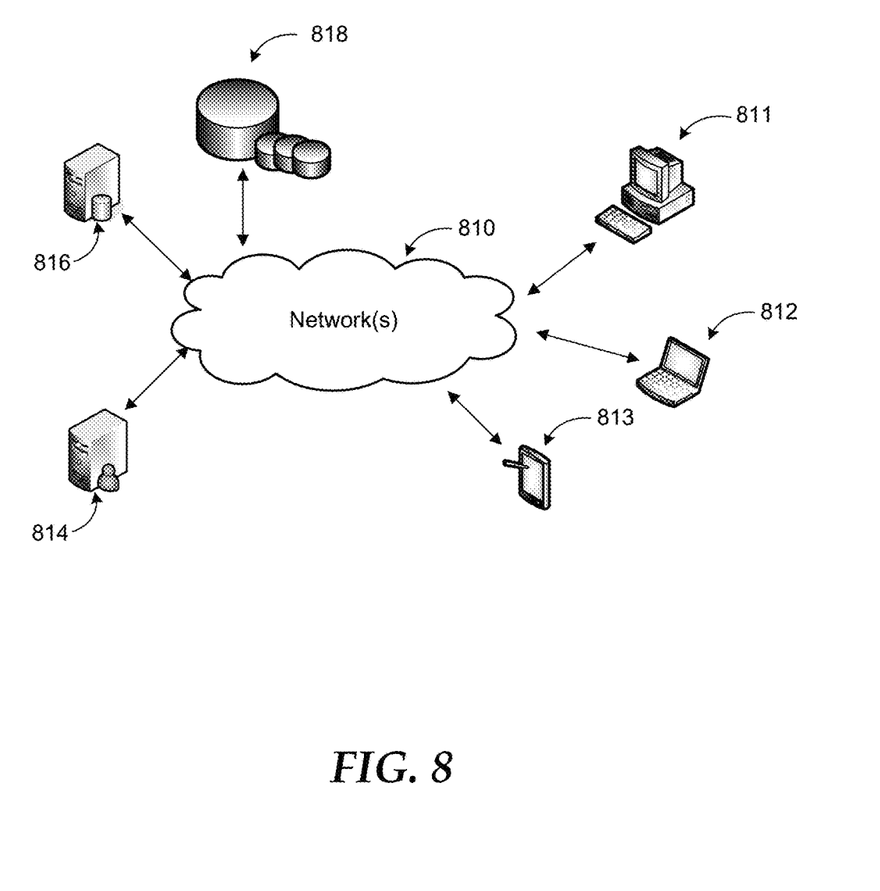
FIG. 8 illustrates a networked environment where embodiments may be implemented.

FIG. 8 is an example networked environment, where embodiments may be implemented. Integration of collaborative online meetings with shared workspaces according to embodiments may be implemented locally or in a distributed manner over a number of physical and virtual clients and servers. Such a system may also be implemented in un-clustered systems or clustered systems employing a number of nodes communicating over one or more networks (e.g. network(s) 810).

Such a system may comprise any topology of servers, clients, Internet service providers, and communication media. Also, the system may have a static or dynamic topology. The term "client" may refer to a client application or a client device. While a networked system implementing embodiments may involve many more components, relevant ones are discussed in conjunction with this figure.

Collaboration applications and online meeting applications may be executed by a server (e.g. server 814) and user interfaces rendered in individual client devices 811-813. The collaboration tasks and online meeting may also be executed in individual applications in each of the client, where the applications communicate with each other. The collaboration application or service may be managed by one or more servers (e.g. server 814). A portion or all of the generated and shared content, as well as any configuration information may be stored in a data store such as data stores 818 through database server 816 or directly by the respective application(s).

Network(s) 8180 may include a secure network such as an enterprise network, an unsecure network such as a wireless open network, or the Internet. Network(s) 810 provide communication between the nodes described herein. By way of example, and not limitation, network(s) 810 may include wired media such as a wired network or direct-wired connection, and wireless media such as acoustic, RF, infrared and other wireless media.

Many other configurations of computing devices, applications, data sources, data distribution systems may be employed to implement a collaborative team site where online meetings are integrated with the shared workspaces. Furthermore, the networked environments discussed in FIG. 8 are for illustration purposes only. Embodiments are not limited to the example applications, modules, or processes.

Figure 9:
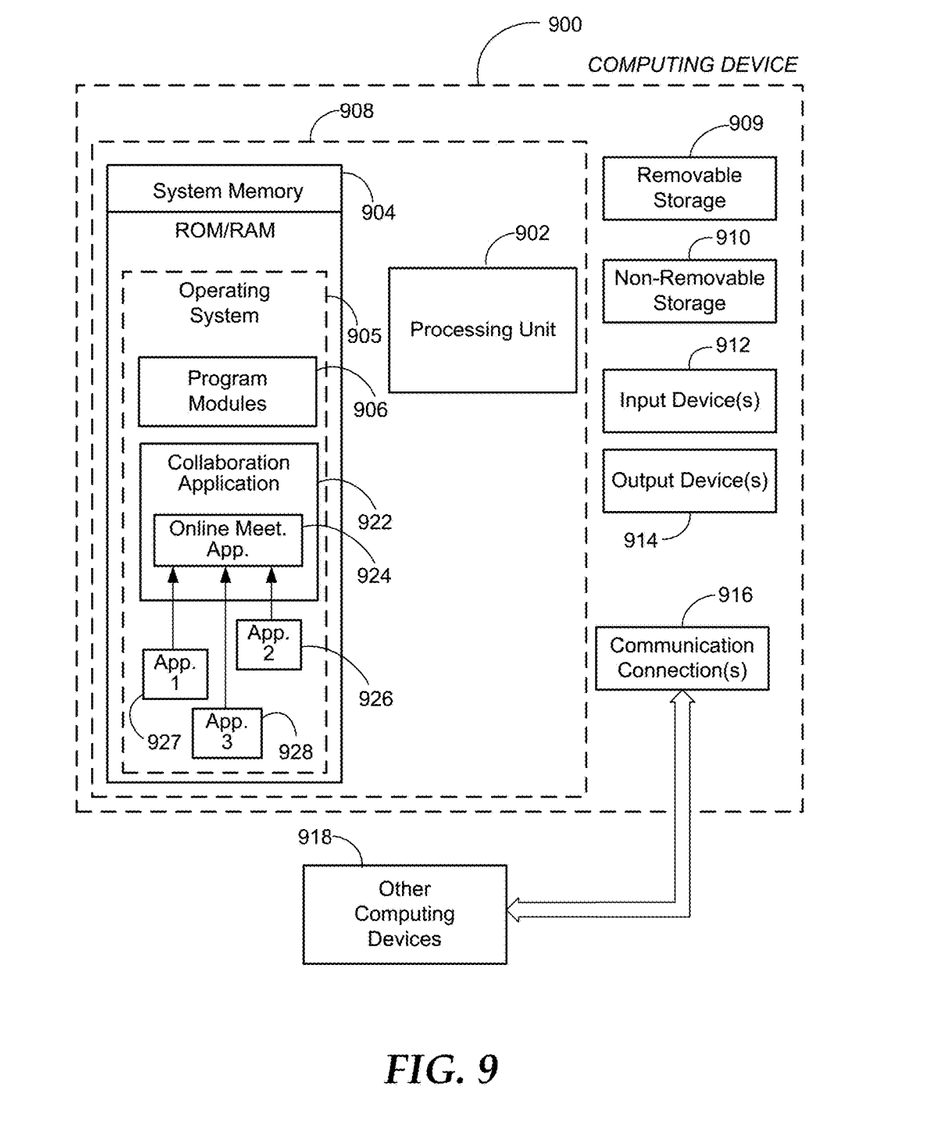
FIG. 9 is a block diagram of an example computing operating environment, where embodiments may be implemented.

FIG. 9 and the associated discussion are intended to provide a brief, general description of a suitable computing environment in which embodiments may be implemented. With reference to FIG. 9, a block diagram of an example computing operating environment is illustrated, such as computing device 900. In a basic configuration, the computing device 900 may be a server executing one or more applications associated with a collaborative team site and typically include at least one processing unit 902 and system memory 904. Computing device 900 may also include a plurality of processing units that cooperate in executing programs. Depending on the exact configuration and type of computing device, the system memory 904 may be volatile (such as RAM), non-volatile (such as ROM, flash memory, etc.) or some combination of the two. System memory 904 typically includes an operating system 905 suitable for controlling the operation of the computing device, such as the WINDOWS® operating systems from MICROSOFT CORPORATION of Redmond, Wash. The system memory 904 may further include one or more software applications such as program modules 906, collaboration application 922, online meeting application 924, and a number of other applications associated with online collaboration such as a video communication application 926, a scheduling application 927, and a document processing application 928 (e.g. a word processing application, a spreadsheet application, a presentation application, etc.).

Collaboration application 922 may be a separate application or an integral module of a hosted service application that provides online collaboration through a shared workspace to users through computing device 900. Online meeting application 924 facilitates online meetings enabling users to communicate with each other as well as work on shared content, generate new content, and the like. Online meeting application 924 may include all of the above described functionality within itself or may coordinate with specific applications such as applications 926-928 to perform the specific tasks, as described previously. This basic configuration is illustrated in FIG. 9 by those components within dashed line 908.

The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by removable storage 909 and non-removable storage 910. Computer storage media may include volatile and nonvolatile, removable and non-removable media implemented in any method or technology for storage of information, such as computer readable instructions, data structures, program modules, or other data. System memory 904, removable storage 909 and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of device 900. Computing device 900 may also have input device(s) 912 such as keyboard, mouse, pen, voice input device, touch input device, etc. Output device(s) 914 such as a display, speakers, printer, etc. may also be included. These devices are well known in the art and need not be discussed at length here.

The computing device 900 may also contain communication connections 916 that allow the device to communicate with other computing devices 918, such as over a wireless network in a distributed computing environment, for example, an intranet or the Internet. Other computing devices 918 may include client devices or server(s) that enable users to participate in the online meeting and work on the shared content managed by the collaboration application 922 of computing device 900. Communication connection 916 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. While the presence of a modulated data signal may be transitory in nature, the signal is generated to cause changes in a receiving device, thereby creating physical and tangible changes (effects) during its reception by the receiving device. By way of example, and not limitation, communication media includes wired media such as a wired network or direct-wired connection, and wireless media such as acoustic, RF, infrared and other wireless media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 10:
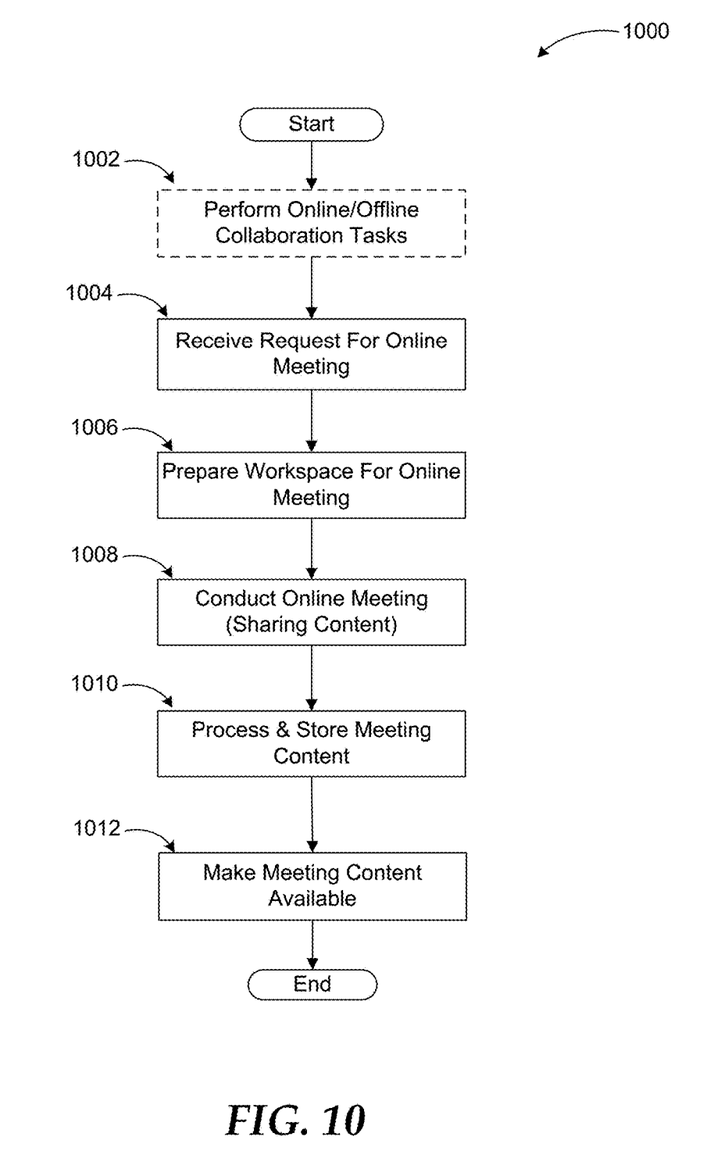
FIG. 10 illustrates a logic flow diagram for a process of integrating an online meeting with a collaborative team site according to embodiments.

FIG. 10 illustrates a logic flow diagram for process 1000 of integrating an online meeting with a collaborative team site according to embodiments. Process 1000 may be implemented, for example, as part of the collaborative team site 220 of FIG. 2.

Process 1000 begins with optional operation 1002, where online and offline collaboration tasks are performed. As discussed above, these may involve sharing documents, versioning modified content, archiving older versions, performing searches in shared content, and the like. The collaboration may also be at least partially offline, where modifications (or new content) generated by participants while they are disconnected from the shared workspace are synchronized with the current versions of documents (content) on the collaborative team site. A team site according to embodiments may also be capable of scheduling and initiating online meetings in conjunction with a shared workspace. Processing moves from optional operation 1002 to operation 1004.

At operation 1004, a request for an online meeting associated with the workspace is received. The request may come from one of the participants or it may be automatically generated in response to a predefined event such as reaching of a milestone in a project. According to other embodiments, the meeting may be a recurring one that is also automatically initiated by the system. Processing advances from operation 1004 to operation 1006.

At operation 1006, the workspace is prepared for the requested meeting. The preparation may include making relevant documents available to participants of the meeting through the online meeting UI, making historic records of similar or relevant meetings available, and the like. Processing proceeds from operation 1006 to operation 1008.

At operation 1008, the online meeting is conducted with shared content. Participants may modify content associated with the meeting, generate new content, delete existing content, and the like. While the meeting is being conducted, it is also recorded in form of an audio and/or video recording as well as any textual data such as exchanged messages. Processing continued from operation 1008 to operation 1010.

At operation 1010, the meeting content is processed and stored upon completion of the meeting. The meeting content includes any changed or created documents (or content) during the meeting as well as any audio/video/textual recording of the meeting. This content may be versioned, formatted, and stored in the shared workspace with relevant links and indices such that the resulting data is reusable and searchable. For example, a spreadsheet document changed during the meeting may be stored as a new version, a whiteboard capture image may be stored as a meeting record along with an audio recording of the meeting. All stored content may be linked to relevant documents within the workspace as well as any past (relevant) meetings or meetings scheduled in the future. Processing advances from operation 1010 to operation 1012, where the processed and stored meeting content is made available to any participants of the collaborative team site. After operation 1012, processing moves to a calling process for further actions.

The operations included in process 1000 are for illustration purposes. Integrating real time collaborative experiences with an online shared workspace may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device, comprising:
   at least one processor; and
   at least one memory storing computer-executable instructions that when executed by the processor cause the computing device to:
   provide a productivity application associated with a shared workspace;
   receive a selection of at least one document in the shared workspace;
   in response to receiving the selection of the at least one document, provide an option to launch an online meeting from the at least one document;
   in response to a selection of the option to launch the online meeting from the at least one document, automatically create an online meeting invitation including a subject line based on a title of the at least one document, automatically determine one or more participants for the online meeting based on the at least one document, and automatically invite the one or more participants;
   launch the online meeting in a user interface, wherein the user interface includes functionality for receiving communications between the one or more participants, for recording the online meeting, and for collaboratively modifying the at least one document; and
   following the online meeting, link the modified at least one document to the communications between the one or more participants, and to a recording of the online meeting in the shared workspace, wherein the modified at least one document, the communications between the one or more participants, and the recording of the online meeting are searchable within the shared workspace.

2. The computing device of claim 1, further comprising:
   update a record of past online meetings regarding the at least one document with at least one of: the modified at least one document, the communications between the one or more participants, or the recording of the online meeting.

3. The computing device of claim 2, further comprising:
   update the record of past online meetings regarding the at least one document with at least one future scheduled online meeting.

4. The computing device of claim 1, further comprising:
   enable a user of the shared workspace to launch the online meeting by selecting the at least one document while offline and then checking the selected at least one document into the shared workspace while online.

5. The computing device of claim 1, further comprising:
   enable a user of the shared workspace to access results of the online meeting while offline by allowing offline access to one or more of: the modified at least one document, the communications between the one or more participants, or the recording of the online meeting.

6. The computing device of claim 1, wherein the online meeting is associated with a plurality of shared workspaces.

7. The computing device of claim 1, further comprising:
   coordinate the online meeting with at least one of: an audio conference application, a video conference application, an electronic mail application, or an instant messaging application.

8. A method for integrating online meetings with one or more shared workspaces, the method comprising:

receiving a selection of at least one document in a shared workspace;

in response to receiving the selection of the at least one document, providing an option to launch an online meeting from the at least one document;

in response to a selection of the option to launch the online meeting from the at least one document, automatically creating an online meeting invitation including a subject line based on a title of the at least one document, automatically determining one or more participants for the online meeting based on the at least one document, and automatically inviting the one or more participants;

launching the online meeting in a user interface, wherein the user interface includes functionality for receiving communications between the one or more participants, for recording the online meeting, and for collaboratively modifying the at least one document; and linking the modified at least one document to the communications between the one or more participants, and to a recording of the online meeting in the shared workspace, wherein the modified at least one document, the communications between the one or more participants, and the recording of the online meeting are searchable within the shared workspace.

9. The method of claim 8, further comprising:
updating a record of past online meetings regarding the at least one document with at least one of: the modified at least one document, the communications between the one or more participants, or the recording of the online meeting.

10. The method of claim 9, further comprising:
updating the record of past online meetings regarding the at least one document with at least one future scheduled online meeting.

11. The method of claim 8, further comprising:
enabling a user of the shared workspace to launch the online meeting by selecting the at least one document while offline and then checking the selected at least one document into the shared workspace while online.

12. The method of claim 8, further comprising:
enabling a user of the shared workspace to access results of the online meeting while offline by allowing offline access to one or more of: the modified at least one document, the communications between the one or more participants, or the recording of the online meeting.

13. The method of claim 8, wherein the online meeting is associated with a plurality of shared workspaces.

14. The method of claim 8, further comprising:
coordinating the online meeting with at least one of: an audio conference application, a video conference application, an electronic mail application, or an instant messaging application.

15. A computer storage device comprising computer-readable instructions that when executed by a processing unit cause a computing device to perform a method of integrating online meetings with one or more shared workspaces, the method comprising:

receiving a selection of at least one document in a shared workspace;

receiving a selection to launch an online meeting from the at least one document;

automatically creating an online meeting invitation comprising:
automatically inserting a subject line and a title based on the at least one document,
automatically determining one or more participants for the online meeting based on the at least one document, and
automatically inviting the one or more participants;

launching the online meeting in a user interface, wherein the user interface includes functionality for receiving communications between the one or more participants, for recording the online meeting, and for collaboratively modifying the at least one document; and linking the modified at least one document, the communications between the participants, and the recording of the online meeting to a record associated with the at least one document in the shared workspace.

16. The computer storage device of claim 15, further comprising:
updating the record associated with the at least one document with at least one future scheduled online meeting.

17. The computer storage device of claim 15, further comprising:
enabling a user of the shared workspace to launch the online meeting by selecting the at least one document while offline and then checking the selected at least one document into the shared workspace while online.

18. The computer storage device of claim 15, further comprising:
enabling a user of the shared workspace to access results of the online meeting while offline by allowing offline access to one or more of: the modified at least one document, the communications between the one or more participants, or the recording of the online meeting.

19. The computer storage device of claim 15, wherein the online meeting is associated with a plurality of shared workspaces.

20. The computer storage device of claim 15, further comprising:
coordinating the online meeting with at least one of: an audio conference application, a video conference application, an electronic mail application, or an instant messaging application.

* * * * *